United States Patent [19]

Inoue

[11] 4,298,781
[45] Nov. 3, 1981

[54] WIRE-CUT ELECTROEROSION MACHINE AND METHOD OF OPERATING SAME

[75] Inventor: Kiyoshi Inoue, Tokyo, Japan

[73] Assignee: Inoue-Japax Research Incorporated, Yokohama, Japan

[21] Appl. No.: 34,860

[22] Filed: Apr. 30, 1979

[30] Foreign Application Priority Data

Jun. 8, 1978 [JP] Japan .................................. 53-69086
Jan. 24, 1979 [JP] Japan .................................. 54-6106

[51] Int. Cl.³ .............................................. B23P 1/02
[52] U.S. Cl. ................................ 219/69 W; 219/69 M
[58] Field of Search ............. 219/69 W, 69 M, 137.71

[56] References Cited

U.S. PATENT DOCUMENTS

| | | | |
|---|---|---|---|
| 3,586,222 | 6/1971 | Rosen | 219/137.71 |
| 3,822,374 | 7/1974 | Ullmann et al. | 219/69 W |
| 4,242,556 | 12/1980 | Ullmann et al. | 219/69 W |

FOREIGN PATENT DOCUMENTS 1474443 5/1977 United Kingdom .

Primary Examiner—C. C. Shaw
Attorney, Agent, or Firm—Karl F. Ross

[57] ABSTRACT

A wire-cut electroerosion machine as well as a method of operating the same wherein a wire electrode is axially and continuously transported from supply means to take-up means to travel through a cutting zone between a pair of wire guide members in which a workpiece is positioned. The machine includes rotary traction means having a first rotary shaft for advancing the wire through the cutting zone from the supply means and permitting it to be collected by the take-up means, and rotary brake means having a second rotary shaft for applying a braking force to the wire to cause it to be stretched between the guide members while being continuously advanced through the cutting zone. The improvement includes means for and steps of: sensing the rotation of the first rotary shaft to produce a first sensing signal representing the rate of rotation thereof; sensing the rotation of the second rotary shaft to produce a second sensing signal representing the rate of rotation thereof; and deriving from the first and second sensing signals an output signal representing a deviation of tension of the wire traveling between a brake rotary means and the traction rotary means or the guide members from a predetermined value. The method and system for detecting a change in the wire tension may also embody means for applying a mechanical vibration to the wire traveling between the guide members and monitoring a vibrational response of the wire.

11 Claims, 7 Drawing Figures

WIRE-CUT ELECTROEROSION MACHINE AND METHOD OF OPERATING SAME

FIELD OF THE INVENTION

The present invention relates to electroerosion and, more particularly, to a wire-cut electroerosion machine and a method of operating the same for machining a workpiece by advancing a continuous wire electrode in juxtaposition therewith to form a machining gap therebetween, across which an electrical machining energy is applied in the presence of a machining fluid to remove material from the workpiece, there being a relative displacement between the workpiece and the traveling wire electrode as material removal proceeds.

BACKGROUND OF THE INVENTION

In an electroerosion machine of this type, the continuous wire electrode unrolled from a supply reel is advanced through a machining region in which the workpiece is positioned between a pair of guide members which serve to position the wire precisely in a predetermined machining relationship with the workpiece and to stretch under tension the traveling wire across the machining region, the wire then being continuously wound on a take-up reel. The continuous advance or travel of the wire is effected typically by traction drive roller means disposed between the guide member on the downstream side and the take-up roller. A desired tension may be established in the traveling wire by providing brake drive roller means at a location between the guide member on the upstream side and the supply reel.

A change in the tension in the traveling wire spanned between the guide members is undesirable. The resulting deflection and oscillation of the wire in the form of a drum across the machining zone hampers stable electroerosion cutting process to yield inaccurate machining results and may also cause the wire to be broken upon dead short-circuiting with the workpiece. The wire electrode when elongated or bent causes the cutting width to become excessively large, the edge portions to be undesirably rounded and machined shape to deviate from a required shape or size.

It has now been observed that constancy of the tension in the traveling wire cannot be attained simply by applying constant drive and brake forces to the wire with a known arrangement. Thus, while a wire produced and rolled on the supply reel with a due precision for electroerosion purposes is commonly employed, it yet unavoidably involves unevenness in diameter and composition over its entire utility length and also may be bent or distorted when mounted on the supply reel. Additionally, in machining operation the wire passing opposed to the workpiece may undergo electrical discharge wear to variable extents and the guide members supporting the wire may also frictionally wear variably or with change in effective tension caused in the wire. Change in the tension caused by these and other operational factors causes varying elongation over the wire and may do its unfavorable bending, distortion, twisting or oscillation which leads to wire breakage, unstable machining and machine inaccuracy.

OBJECT OF THE INVENTION

It is, therefore, a principal object of the present invention to provide an improved wire-cut electroerosion machine as well as a method of operating same, whereby the aforementioned difficulties encountered in conventional electroerosion machines are overcome.

SUMMARY OF THE INVENTION

This and other objects are attained by providing, in accordance with the present invention, a wire-cut electroerosion machine for machining a workpiece with a continuous traveling wire constituting an electroerosion electrode, which comprises: supply reel means for the wire; take-up reel means for the wire; a pair of guide members for guiding the wire across a machining zone in which a machinable portion of the workpiece is located in the presence of a machining fluid; rotary traction means having a first rotary shaft for advancing the wire through the machining zone from the supply reel means and permitting it to be collected onto the take-up reel means; rotary brake means having a second rotary shaft for applying a braking force to the wire to cause it to be stretched between the guide members while permitting it to continuously travel through the machining zone; first sensing means responsive to the rotation of the first rotary shaft for providing a first sensing signal representing the rate of rotation thereof; second sensing means responsive to the rotation of the second rotary shaft for providing a second sensing signal representing the rate of rotation thereof; and circuit means responsive to said first and second sensing signals for deriving therefrom an output signal representing a deviation of tension of the wire traveling between the brake and traction rotary means from a predetermined value.

The invention also provides a method of operating a wire-cut electroerosion machine having supply reel means for the wire, take-up reel means for the wire, a pair of guide members for guiding the wire across a machining zone in which a machinable portion of the workpiece is located in the presence of a machining fluid, rotary traction means having a first rotary shaft for advancing the wire through the machining zone from the supply reel means and permitting it to be collected onto the take-up reel means and rotary brake means having a second rotary shaft for applying a braking force to the wire to cause it to be stretched between the guide members while permitting it to continuously travel through the machining zone, said method comprising the steps of sensing the rotation of the first rotary shaft to produce a first sensing signal representing the rate of rotation thereof; sensing the rotation of the second rotary shaft to produce a second sensing signal representing the rate of rotation thereof; and deriving from said first and second sensing signals an output signal representing a deviation of tension of the wire traveling between the brake and traction rotary means from a predetermined value.

The invention also contemplates a method of electroerosion-machining a workpiece with a continuous traveling wire constituting an electroerosion electrode, in which the continuous wire is advanced by traction drive means from supply reel means to take-up reel means through a cutting zone defined between a pair of guide members and brake drive means is also provided which, in cooperation with the traction drive means, stretches the wire between the guide means while permitting it to continuously travel through the machining zone, the method comprising the steps of applying a mechanical vibration to the wire traveling between the guide means and monitoring a vibrational response of the wire to ascertain a change, when it occurs, in the tension caused in the traveling wire. An apparatus for carrying out the method according to this aspect of the invention may include an electromechanical oscillator energizable by a high-frequency alternating-current source to impart a mechanical vibration to the traveling wire and sensing means coupled with the electrochemical oscillator to thereby ascertaining a change in the tension caused in the wire.

BRIEF DESCRIPTION OF DRAWING

The objects, features and advantages of the present invention will become more readily apparent from the following description of certain embodiments thereof taken with reference to the accompanying drawing in which.

SPECIFIC DESCRIPTION

Figure 1:
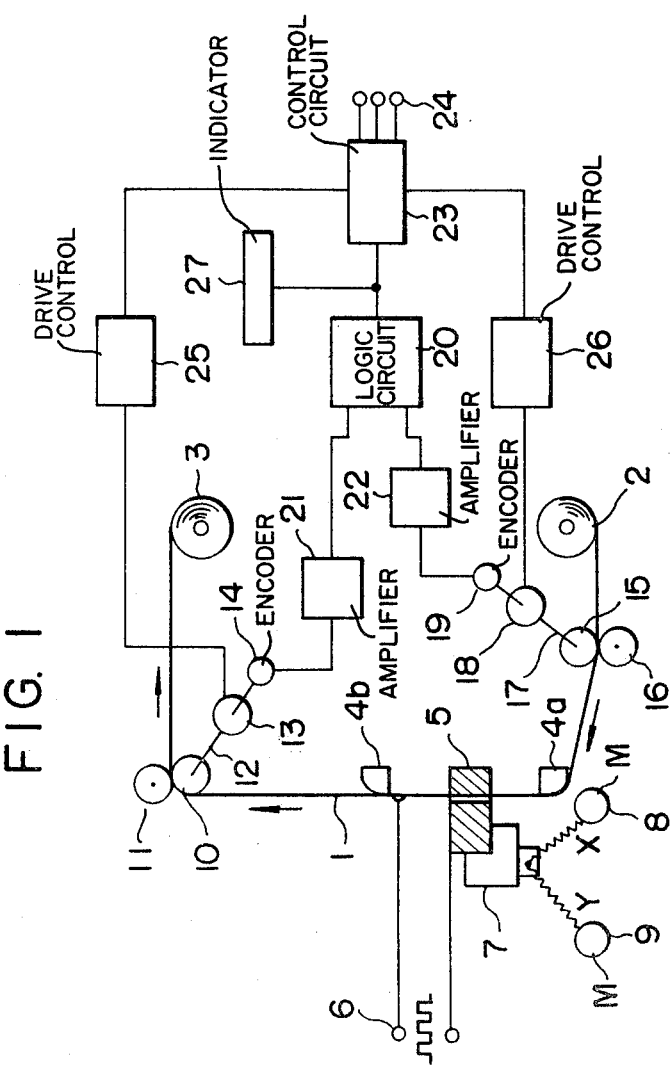
FIG. 1 is a diagrammatic view illustrating a wire-cut electroerosion machine including basic components thereof and adapted to embody the principles of the invention.

Referring now to FIG. 1, a continuous wire 1 which may be copper, brass or the like metal or alloy, having a diameter of 0.05 to 0.5 mm, constitutes an electroerosion electrode and is shown unwound from a supply reel 2 and wound on a take-up reel 3 while being transported through a machining zone defined between a pair of wire guides 4a and 4b. The guide members 4a and 4b serve to stretch the wire 1 traveling therebetween and to position it in a predetermined machining relationship with a workpiece 5 disposed in the machining zone with a machining fluid, i.e. liquid dielectric or electrolyte supplied thereto. A power supply 6 is provided with output terminals electrically connected to the wire 1 and the workpiece 5 to apply across the machining gap between them an electric machining energy which is usually in the form of pulses to remove material from the workpiece 5.

As material removal proceeds, a table 7 on which the workpiece 5 is fixedly mounted is displaced by a pair of motors 8 and 9, e.g., stepping motors, to move along X and Y axes in accordance with a numerical control program or copying pattern so that electroerosion with the wire electrode 1 may continue in the workpiece 5 along a prescribed cutting path.

Means for transporting or axially advancing the wire 1 includes a traction drive roller 10 downstream of the guide member 4b and having a rubber or the like formed or surfaced frictional rotatable pinch roller 11 in engagement therewith to bear the wire 1 introduced against the supporting drive roller 10. The drive roller 10 has a rotary shaft 12 driven by a motor 13 to cause the rollers 10 and 11 to carry the wire 1 introduced therebetween and to apply a traction to the wire 1 to cause it continuously to be unrolled from the supply reel 2 and to travel continuously through the machining zone between the guide members 4a and 4b. The drive shaft 12 is provided with an encoder 14 responsive to a rotation thereof to provide a signal representing the rate of rotation of the drive shaft 12. Upstream of the guide members 4a and 4b there is provided a braking drive roller 15 having a rubber or the like formed or surfaced frictional rotatable pinch roller 16 in engagement therewith to bear the wire 1 introduced against the supporting roller 16. The braking drive roller 15 has a rotary shaft 17 driven by a torque motor 18 to apply a brake force to the wire 1 continuously unwound from the supply reel 2, passing between the guide members 4a and 4b, driven between the rollers 10 and 11 and wound on the take-up reel 3. The braking drive shaft 17 is provided with an encoder 19 responsive to a rotation thereof to provide a signal representing the rate of the rotation of the rotary shaft 17.

The outputs of encoders 14 and 19 are fed via amplifiers 21 and 22, respectively, to a logic circuit 20 where they are compared to provide a logic output which is applied on one hand to a control circuit 23 and on the other to an indicator device 27. The logic circuit 20 provides the logic output which represents the tension, elongation and/or bending of the wire 1 ascertained from the amplified two signals received from the encoders 14 and 19. A desired value of wire tension, elongation and/or bending are keyed in the control circuit 23 for comparison with the corresponding input signal from the logic circuit 20 to provide a control signal which acts on one or both of drive control circuits 25 and 26 for the wire traction and braking motors 13 and 18, respectively. The indicator device 27 may be provided to provide conveniently a visible indication of the tension, elongation and/or bending of the wire 1 detected.

In operation, the drive assembly 10, 11, 12 and 13 causes the wire 1 to be unrolled from the supply reel 2 and rolled on the take-up reel 3 to assure its continuous travel through the machining zone between the guide members 4a and 4b under a tension caused by the brake assembly 15, 16, 17 and 18 in the wire 1, tending it to be straightened and elongated. It has been found that it is difficult to maintain this tension constant by applying a constant drive and brake forces to the wire 1 with these assemblies. Thus, while a wire produced and rolled on the supply reel with due precision for electroerosion purposes is commonly employed, it yet unavoidably involves unevenness in diameter and composition over its entire utility length and also may be bent or distorted when mounted on the supply reel. Additionally, in machining operation the wire passing in juxtaposition with the workpiece may undergo electrical discharge wear to variable extents and the guide members supporting the wire may also frictionally wear variably or with change in effective tension caused in the wire. Change in the tension caused by the wire size, composition and other operational factors causes varying elongation over the wire and may do its unfavorable bending, distortion or twisting which lead to wire breakage, unstable machining and machining inaccuracy.

In order to embody the invention, the encoder 14 is provided to detect the rotation of the wire traction drive shaft 21 and provide a corresponding signal which after amplification by the amplifier 21 is fed to the logic circuit 20. On the other hand, the encoder 19 detects the rotation of the wire braking drive shaft 17 to provide a corresponding signal which after amplification by the amplifier 22 is fed to the logic circuit 20. The logic circuit 20 functions to provide a difference between the two detection signals received and thereby to ascertain change in tension, elongation or bending caused in the wire 1. One output from the logic circuit 20 is used to operate the display network 27 to cause it to display the tension, elongation or bending actually monitored in numerical or other form. The second output of the circuit 20 applied to the control circuit 23 is logically compared with the preset signal keyed in from the terminal 24 representing a desired value in the tension or elongation to provide the control signal. Here, the logical output of the circuit 20 may provide an output representing one of the tension, elongation and bending or two or three of them in combination which is applied to the control circuit 23. The latter may be designed to include a control arrangement corresponding to any one of the three tension variables or to provide an output corresponding to a logical sum or logical product of the variables. The control signal may make use of a deviation of an input signal from a preset value or may discriminate the incoming signal with reference to the preset value. The control is effected to regulate the corresponding drive circuits 25 and 26 of one or both of the traction and braking drive motors 13 and 18 by controlling the electrical drive energy or, where a pulsed drive is employed, the duration or frequency of drive pulses for the same.

Figure 2A:
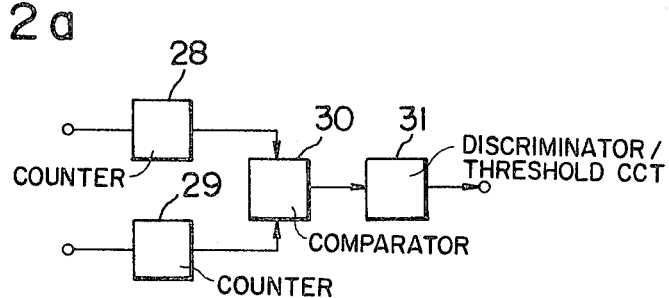
FIGS. 2a, 2b and 2c are block diagrams of circuit elements in the system of FIG. 1 or alternatives thereto.
Figure 2B:
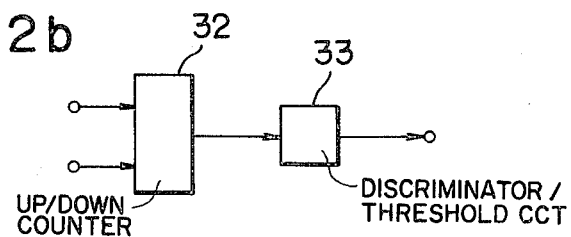
Figure 2C:
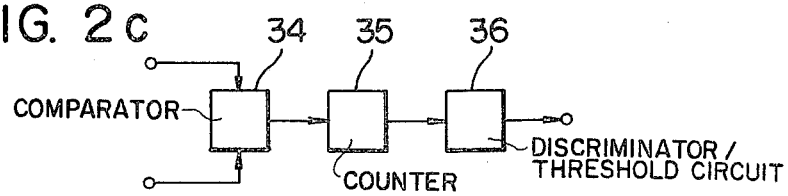

FIGS. 2a–2c there are illustrated three exemplary arrangements for the logic circuit 20. In the system of FIG. 2a, pulse signals from the encoders 14 and 19 are applied to counters 28 and 29, respectively, which are combined at a comparator 30 which provides a difference in count which is discriminated by a discriminator or threshold circuit 31. In the system of FIG. 2b, the two detection signals are applied to an up/down or reversible counter 32 at its count-up and count-down inputs, respectively, to provide a differential count level which is discriminated by a discriminator or threshold circuit 33. In the system of FIG. 2c, the two signals are initially applied to a comparator 34 which provides a difference in magnitude in the form of pulses which are accumulated by a counter 35 whose output is applied to and discriminated in a discriminator or threshold circuit 36. In any of the arrangements (a), (b) and (c), the difference between the number or rates of rotation of the traction drive shaft 12 and the braking drive shaft 17 sensed provides the tension, from which the elongation and bending are also ascertained. The drive circuit 25, 26 for one or both of the motors 13 and 18 may be controlled manually or automatically with the sensed signal causing the tension, elongation or bending in the wire 1 changed to approach a desired or preset value so that electroerosion may continue with the continuous wire electrode maintained straightened under a given tension and yield a predetermined elongation. The operational instability tending to cause wire breakage and undesirable oscillation can thereby be eliminated to allow high precision and efficiency wire-cut electroerosion.

The drive motors 13 and 18 may be constituted either by DC motors or stepping motors. In the case of the latter, the direct-current control signal is converted into pulses by a voltage-frequency converter. The pulsed control signal may also be used with the DC motor in which case the DC drive signal is obtained by D-A conversion.

Figure 3:
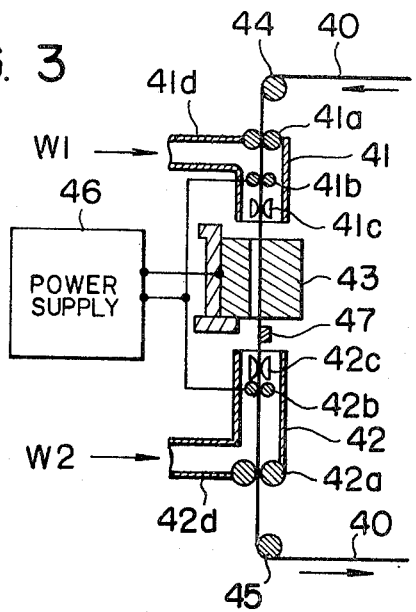
FIG. 3 is a diagrammatic representation of an electroerosion machine with a traveling wire electrode for embodying the present invention.

FIG. 3 shows another form of a wire tension detector system for use in embodying the present invention. In this system, a continuous wire 40 constituting a tool electrode in electroerosion machining is shown guided through a pair of coolant conduits 41 and 42 between which a workpiece 43 is mounted in machining relationship with the wire 40. The wire 40 is unrolled from a source reel and rolled on a take-up reel, both of which as well as traction and brake rollers are omitted in this FIGURE and may be ones which form the arrangement of FIG. 1. In the path of the wire 40, rollers 44 and 45 serve to change the direction of wire travel into and away from the machining zone while rollers 41a, 41b and 41c in the guide conduit 41 and rollers 42a, 42b and 42c in the guide conduit 42 act to place the traveling wire 40 precisely in a machining position relative to the workpiece 43. The conduits 41 and 42 are provided respectively with fluid inlets 41d and 42d through which a machining fluid W1, W2 such as distilled water is supplied for delivery to the machining zone and also to serve as a coolant for the machining wire electrode 40. An electroerosion power supply 46 is electrically connected on one side to the workpiece 43 and on the other to the wire 40 at rollers 41b and 42b in the conduits 41 and 42, respectively. The rollers 41a and 42a constitute liquid-tight rolls.

Figures 4, 5:
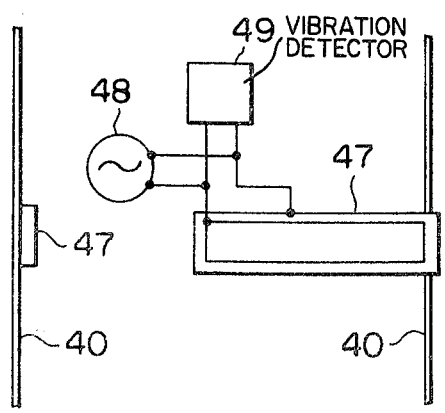
FIGS. 4 and 5 are diagrams illustrating principles of the invention.

In the region of the machining zone between the machining positioning rollers 41c and 42c there is provided a mechanical oscillator 47 in contact with or close proximity of the wire 40 to apply thereto an oscillation or vibration which acts as a signal source. Enlarged lateral and frontal views of the oscillator 47 are shown in FIGS. 4 and 5, respectively, with elements associated therewith also seen in the latter. The oscillator element 47 has an oscillatile or vibratile surface for imparting a vibration to the wire 40 traveling in contact therewith or proximal thereto. The element 47 may be composed of quartz, barium titanate ($BaTiO_3$), lead zirco-titanate or a solid solution of lead zirconate and lead titanate ($PbZrO_3 + PbTiO_3$) or the like electromechanical transducer oscillating element and is energized through first terminals by a high-frequency alternating current source 48 at a frequency of 1 to 100 KHz or higher to generate mechanical vibration of the corresponding frequency. The element 47 (FIGS. 4 and 5) has second terminals connected to a detector 49 for sensing a vibrational response of the wire 40.

In operation, the element 47 applies to the wire 40 a vibration with an amplitude of 0.1 to 10 $\mu$m at a frequency of 1 to 100 KHz. If there is no change in tension caused in the wire 40, there will be no change in the vibrational response detected by the circuit 49. If there is any elastic change such as change in tension and elongation or occurrence of bending of the wire or its tendency to breakage, there will be a change in the response frequency which is sensed by the detector 49. Actually it has been found that slight change in the tension caused in the wire 40 can be monitored at a high fidelity when sensed by means of vibration response. The sensed signal can be used to actuate an indicator display and to control the drive circuit for the motor applying a traction force and/or the motor applying a brake force to the wire 40 in the manner as described earlier.

There is thus provided in accordance with the present invention an improved wire-cut electroerosion machine as well as a method of operating the same, which effectively protects the wire electrode from breakage and permits an improved machining performance while assuring an enhanced machining accuracy.

What is claimed is:

1. A wire-cut electroerosion machine for cutting a workpiece with a continuous traveling wire constituting an electroerosion electrode, comprising:
   supply means for said wire;
   take-up means for said wire;

a pair of guide members for guiding said wire across a cutting zone in which a machinable portion of said workpiece is positioned;

rotary traction means having a first rotary shaft for advancing said wire through said cutting zone from said supply means and permitting said wire to be collected onto said take-up means downstream of said cutting zone;

rotary brake means having a second rotary shaft for applying a braking force to said wire to cause it to be stretched between said guide members while being continuously advanced through said cutting zone therebetween;

first sensing means responsive to the rotation of said first rotary shaft for providing a first electrical sensing signal representing the rate of rotation thereof;

second sensing means responsive to the rotation of said second rotary shaft for providing a second electrical sensing signal representing the rate of rotation thereof; and circuit means responsive to said first and second electrical sensing signals for deriving therefrom an electrical output signal representing a deviation of tension of said wire advancing through said cutting zone between said brake and traction means from a predetermined value.

2. The machine defined in claim 1 wherein said first sensing means includes first encoder means for producing a series of first pulses in response to an angular displacement of said first rotary shaft and said second sensing means includes second encoder means for producing a series of pulses in response to an angular displacement of said second rotary shaft, said first and second pulses constituting said first and second sensing signals, respectively.

3. The machine defined in claim 1 wherein said circuit means includes comparator means for comparing said first and second sensing signals to produce a differential signal and discriminator means for comparing said differential signal with a reference value to produce said output signal.

4. The machine defined in claim 1, further comprising display means for displaying said output signal.

5. The machine defined in claim 1, further comprising control means for controlling at least one of said traction and brake means with said output signal so as to maintain said wire tension substantially constant.

6. A method of operating a wire-cut electroerosion machine having supply means for providing a continuous wire constituting an electroerosion electrode, take-up means for said wire; a pair of guide members for guiding said wire across a machining zone in which a machinable portion of a workpiece is located, rotary traction means having a first rotary shaft for advancing said wire through said machining zone from said supply means and permitting it to be collected onto said take-up means downstream of said machining zone and rotary brake means having a second rotary shaft for applying a braking force to said wire to cause it to be stretched between said guide members while permitting it to continuously travel through said machining zone therebetween, said method comprising the steps of sensing the rotation of said first rotary shaft to produce a first electrical sensing signal representing the rate of rotation thereof; sensing the rotation of said second rotary shaft to produce a second electrical signal representing the rate of rotation thereof; and deriving from said first and second sensing signals an electrical output signal representing a deviation of tension of said wire traveling between said brake rotary means and said traction rotary means through said machining zone from a predetermined value.

7. The method defined in claim 6 wherein each of said first and second sensing signals is in the form of pulses.

8. The method defined in claim 6 wherein said first and second sensing signals are compared to produce a differential signal, further comprising the step of comparing said differential signal with a reference value to produce said output signal.

9. The method defined in claim 6 further comprising the step of displaying said output signal.

10. The method defined in claim 6, further comprising the step of controlling at least one of said traction and brake means with said output signal so as to maintain said wire tension substantially constant.

11. In an electroerosion machine for machining a workpiece with a continuous traveling wire constituting an electroerosion electrode wherein a continuous wire is advanced by traction means through a cutting zone and the advance of the wire through said zone is retarded by brake means operable to stretch said wire across said zone, the improvement which comprises:

detector means operatively coupled to said wire for ascertaining a change in the tension thereof across said zone;

logic circuit means connected to said detector means for generating an electronic output upon the detection of a change in said tension from a predetermined value; and control means connected to said logic circuit means for selectively operating said traction means and said brake means to restore said tension to said predetermined value, said traction means having a first rotary shaft and said brake means having a second rotary shaft, said detector means comprising first sensing means responsive to the rotation of said first shaft for providing a first electrical sensing signal representing the rate of rotation thereof, second sensing means responsive to the rotation of said second shaft for providing a second electrical sensing signal representing the rate of rotation thereof, said sensing signals being applied to said logic circuit.

* * * * *